(12) United States Patent
Kawase

(10) Patent No.: US 12,141,259 B2
(45) Date of Patent: Nov. 12, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 17/909,653

(22) PCT Filed: Mar. 31, 2020

(86) PCT No.: PCT/JP2020/014926
§ 371 (c)(1),
(2) Date: Sep. 6, 2022

(87) PCT Pub. No.: WO2021/199338
PCT Pub. Date: Oct. 7, 2021

(65) Prior Publication Data
US 2023/0113395 A1      Apr. 13, 2023

(51) Int. Cl.
*G06F 21/32*          (2013.01)
(52) U.S. Cl.
CPC .................................. *G06F 21/32* (2013.01)
(58) Field of Classification Search
None
See application file for complete search history.

(56) References Cited

U.S. PATENT DOCUMENTS

| 2001/0054951 | A1  | 12/2001 | Kimoto et al. |
| 2016/0189162 | A1* | 6/2016  | Taira ...................... G06Q 30/01 705/44 |

(Continued)

FOREIGN PATENT DOCUMENTS

| JP | H04-199487 A   | 7/1992 |
| JP | H11-161790 A   | 6/1999 |
| JP | 2000-222667 A  | 8/2000 |

(Continued)

OTHER PUBLICATIONS

JP Office Action for JP Application No. 2022-014901, mailed on Apr. 20, 2023 with English Translation.

(Continued)

*Primary Examiner* — Cai Y Chen
(74) *Attorney, Agent, or Firm* — Sughrue Mion, PLLC

(57) ABSTRACT

An information processing apparatus according to the present invention includes: an acquisition unit that acquires biometric information on a user in a procedure area where the user is able to select a first scheme involving use of biometric authentication in a procedure or a second scheme not involving use of the biometric authentication in the procedure; a matching unit that matches the biometric information with registered biometric information on a registrant allowed to use the first scheme and determines whether or not the user is the registrant; and a guidance unit that, when it is determined by the matching unit that the user is the registrant, guides the user for a procedure place corresponding to the first scheme and, when it is determined that the user is not the registrant, generates guidance information about a way to a procedure place corresponding to the second scheme.

13 Claims, 15 Drawing Sheets

(56) References Cited

U.S. PATENT DOCUMENTS

| | | |
|---|---|---|
| 2017/0070501 A1 | 3/2017 | Saito et al. |
| 2020/0043118 A1 | 2/2020 | Sakaguchi et al. |

FOREIGN PATENT DOCUMENTS

| | | |
|---|---|---|
| JP | 2002-008070 A | 1/2002 |
| JP | 2002-140742 A | 5/2002 |
| JP | 2005-031968 A | 2/2005 |
| JP | 2005-135310 A | 5/2005 |
| JP | 2005-149527 A | 6/2005 |
| JP | 2006-053820 A | 2/2006 |
| JP | 2007-079656 A | 3/2007 |
| JP | 2007-179303 A | 7/2007 |
| JP | 5541407 B1 | 7/2014 |
| JP | 2015-090662 A | 5/2015 |
| JP | 2015-215767 A | 12/2015 |
| JP | 2015-222459 A | 12/2015 |
| JP | 2016-126749 A | 7/2016 |
| JP | 2018-045340 A | 3/2018 |
| JP | 2018-109935 A | 7/2018 |
| JP | 2019-159801 A | 9/2019 |
| JP | 2019-164448 A | 9/2019 |
| JP | 2020-004088 A | 1/2020 |
| WO | 2005/055151 A1 | 6/2005 |
| WO | 2015/136938 A1 | 9/2015 |
| WO | 2019/225550 A1 | 11/2019 |
| WO | 2020/026367 A1 | 2/2020 |

OTHER PUBLICATIONS

Japanese Office Action for JP Application No. 2020-217163 mailed on Nov. 18, 2021 with English Translation.

International Search Report for PCT Application No. PCT/JP2020/014926, mailed on Jun. 23, 2020.

Extended European Search Report for EP Application No. 20928981.8, dated on Apr. 17, 2023.

Rosebrock, Adrian: "Face recognition with OpenCV, Python, and deep learning" _XP093038099, pyimagesearch.com, Jun. 18, 2018, pp. 1-207.

JP Office Action for JP Application No. 2023-188093, mailed on Sep. 19, 2024 with English Translation.

* cited by examiner

FIG. 2

| No | ITEM NAME |
|---|---|
| 1 | RESERVATION NUMBER |
| 2 | FLIGHT NUMBER |
| 3 | AIRLINE CODE |
| 4 | PASSENGER NAME |
| 5 | DEPARTURE PLACE |
| 6 | DESTINATION |
| 7 | FLIGHT DATE |
| 8 | SEAT NUMBER |
| 9 | NATIONALITY |
| 10 | PASSPORT NUMBER |
| 11 | FAMILY NAME |
| 12 | FIRST NAME |
| 13 | DATE OF BIRTH |
| 14 | SEXUALITY |
| ... | ... |

FIG. 3

| No | ITEM NAME |
|---|---|
| 1 | USER ID |
| 2 | REGISTERED FACE IMAGE |
| 3 | FEATURE AMOUNT |
| 4 | PASSENGER NAME |
| 5 | RESERVATION NUMBER |
| 6 | DEPARTURE PLACE |
| 7 | DESTINATION |
| 8 | FLIGHT DATE |
| 9 | AIRLINE CODE |
| 10 | FLIGHT NAME |
| 11 | SEAT NUMBER |
| 12 | NATIONALITY |
| 13 | PASSPORT NUMBER |
| 14 | FAMILY NAME |
| 15 | FIRST NAME |
| 16 | DATE OF BIRTH |
| 17 | SEXUALITY |
| 18 | PROCEDURE STATUS (P1) |
| 19 | PROCEDURE STATUS (P2) |
| 20 | PROCEDURE STATUS (P3) |
| 21 | PROCEDURE STATUS (P4) |
| 22 | PROCEDURE STATUS (P5) |
| ... | ... |

FIG. 4

| No | ITEM NAME |
|---|---|
| 1 | USER ID |
| 2 | PASSAGE TIME |
| 3 | DEVICE NAME |
| 4 | OPERATION SYSTEM TYPE |
| 5 | PASSAGE TOUCH POINT |
| 6 | PROCEDURAL SCHEME |
| ... | ... |

FIG. 13

Procedure status list screen

| User ID | Passport number | Name | Nationality | Face image | Flight name | Departure place | Destination | Departure time | Boarding gate | Status/Procedural scheme ||||||
|---|---|---|---|---|---|---|---|---|---|---|---|---|---|---|
| | | | | | | | | | | Check-in procedure | Baggage check-in procedure | Security inspection procedure | Departure inspection procedure | Boarding on aircraft ||
| 10101 | \*\*-\*\*\*\*\*53 | AAA aaa | JPN | 😊 | AB101 | NRT | LHR | 6:00 | 50 | Completed Automatic | Completed Face authentication | Completed Face authentication | Completed Face authentication | Completed Face authentication |
| 10102 | \*\*-\*\*\*\*\*42 | BBB bbb | JPN | — | AB102 | NRT | CDG | 6:10 | 5 | Completed Automatic | Completed Face authentication | Completed Face-to-face | Completed Face-to-face | Not completed |
| 10103 | \*\*-\*\*\*\*\*61 | CCC ccc | JPN | 😊 | AB103 | NRT | FCO | 6:20 | 4 | Completed Automatic | Completed Face authentication | Completed Face-to-face | Not completed | Not completed |
| 10104 | \*\*-\*\*\*\*\*25 | DDD ddd | JPN | 😊 | AB104 | NRT | MXP | 6:30 | 5 | Completed Automatic | Completed Face authentication | Not completed | Not completed | Not completed |
| 10105 | \*\*-\*\*\*\*\*44 | EEE eee | JPN | 😊 | AB105 | NRT | FRA | 6:40 | 6 | Completed Automatic | Completed Face authentication | Completed Face authentication | Not completed | Not completed |
| 10106 | \*\*-\*\*\*\*\*97 | FFF fff | JPN | 😊 | AB106 | NRT | MUC | 6:50 | 4 | Completed Automatic | Completed Face authentication | Completed Face authentication | Not completed | Not completed |
| 10107 | \*\*-\*\*\*\*\*04 | GGG ggg | JPN | 😊 | AB107 | NRT | DUS | 7:00 | 5 | Completed Automatic | Completed Face authentication | Completed Face authentication | Not completed | Not completed |
| 10108 | \*\*-\*\*\*\*\*21 | HHH hhh | JPN | — | AB108 | NRT | AMS | 7:10 | 6 | Completed Face-to-face | Completed Face-to-face | Completed Face-to-face | Not completed | Not completed |
| 10109 | \*\*-\*\*\*\*\*84 | III iii | JPN | 😊 | AB109 | NRT | ZHR | 7:20 | 4 | Completed Automatic | Completed Face authentication | Not completed | Not completed | Not completed |
| 10110 | \*\*-\*\*\*\*\*29 | JJJ jjj | JPN | 😊 | AB110 | NRT | VIE | 7:30 | 5 | Completed Automatic | Completed Face authentication | Not completed | Not completed | Not completed |
| 10111 | \*\*-\*\*\*\*\*68 | KKK kkk | JPN | 😊 | AB111 | NRT | WAW | 7:40 | 6 | Completed Automatic | Completed Face authentication | Not completed | Not completed | Not completed |
| 10112 | \*\*-\*\*\*\*\*72 | LLL lll | JPN | — | AB112 | NRT | SVO | 7:50 | 4 | Completed Face-to-face | Completed Face-to-face | Not completed | Not completed | Not completed |

...

INFORMATION PROCESSING APPARATUS, INFORMATION PROCESSING METHOD, AND STORAGE MEDIUM

This application is a National Stage Entry of PCT/JP2020/014926 filed on Mar. 31, 2020, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a ticketless boarding system to perform procedures on a passenger by using biometric authentication at a plurality of check points (a check-in lobby, a security inspection site, a boarding gate, and the like). Further, Patent Literature 2 discloses a cardless payment system to perform a payment process on a customer for an item by using biometric authentication at a cash register of a shop.

CITATION LIST

Patent Literature

PTL 1: Japanese Patent Application Laid-Open No. 2007-79656
PTL 2: Japanese Patent Application Laid-Open No. 2016-126749

SUMMARY OF INVENTION

Technical Problem

As illustrated in Patent Literature 1 and Patent Literature 2, procedures involving use of biometric authentication have been automated in various fields. In currently provided procedure areas, users may often perform a procedure after selecting one of an automated lane where biometric authentication is used to perform the procedure and a manned lane where a staff member is deployed. In a procedure area where a procedural scheme involving use of biometric authentication or a procedural scheme involving use of an authentication method other than biometric authentication can be selected, however, if a user makes a mistake in selection of the procedural scheme, the throughput in the procedure area will be reduced.

Accordingly, in view of the problem described above, the present invention intends to provide an information processing apparatus, an information processing method, and a storage medium that can improve the throughput in a procedure area where a procedural scheme involving use of biometric authentication or a procedural scheme involving use of an authentication method other than biometric authentication can be selected.

Solution to Problem

According to one example aspect of the present invention, provided is an information processing apparatus including: an acquisition unit that acquires biometric information on a user in a procedure area where the user is able to select a first scheme involving use of biometric authentication in a procedure or a second scheme not involving use of the biometric authentication in the procedure; a matching unit that matches the biometric information with registered biometric information on a registrant, the registrant being allowed to use the first scheme, and determines whether or not the user is the registrant; and a guidance unit that, when it is determined by the matching unit that the user is the registrant, guides the user for a procedure place corresponding to the first scheme and, when it is determined that the user is not the registrant, generates guidance information about a way to a procedure place corresponding to the second scheme.

According to another example aspect of the present invention, provided is an information processing method comprising: acquiring biometric information on a user in a procedure area where the user is able to select a first scheme involving use of biometric authentication in a procedure or a second scheme not involving use of the biometric authentication in the procedure; matching the biometric information with registered biometric information on a registrant, the registrant being allowed to use the first scheme, and determining whether or not the user is the registrant; and when it is determined that the user is the registrant, guiding the user for a procedure place corresponding to the first scheme and, when it is determined that the user is not the registrant, guiding the user about a procedure place corresponding to the second scheme.

According to yet another example aspect of the present invention, provided is a storage medium storing a program that causes a computer to perform: acquiring biometric information on a user in a procedure area where the user is able to select a first scheme involving use of biometric authentication in a procedure or a second scheme not involving use of the biometric authentication in the procedure; matching the biometric information with registered biometric information on a registrant, the registrant being allowed to use the first scheme, and determining whether or not the user is the registrant; and when it is determined that the user is the registrant, guiding the user for a procedure place corresponding to the first scheme and, when it is determined that the user is not the registrant, guiding the user about a procedure place corresponding to the second scheme.

Advantageous Effects of Invention

According to the present invention, it is possible to provide an information processing apparatus, an information processing method, and a storage medium that can improve the throughput in a procedure area where a procedural scheme involving use of biometric authentication or a procedural scheme involving use of an authentication method other than biometric authentication can be selected.

BRIEF DESCRIPTION OF DRAWINGS

FIG. 2 is a diagram illustrating an example of information stored in a boarding reservation information DB according to the first example embodiment.

FIG. 3 is a diagram illustrating an example of information stored in a user information DB according to the first example embodiment.

FIG. 4 is a diagram illustrating an example of information stored in a passage history information DB according to the first example embodiment.

FIG. 13 is a diagram illustrating an example of a screen displayed on the operation terminal according to the first example embodiment.

DESCRIPTION OF EMBODIMENTS

Exemplary example embodiments of the present invention will be described below with reference to the drawings. Throughout the drawings, the same elements or corresponding elements are labeled with the same references, and the description thereof may be omitted or simplified.

First Example Embodiment

Figure 1:
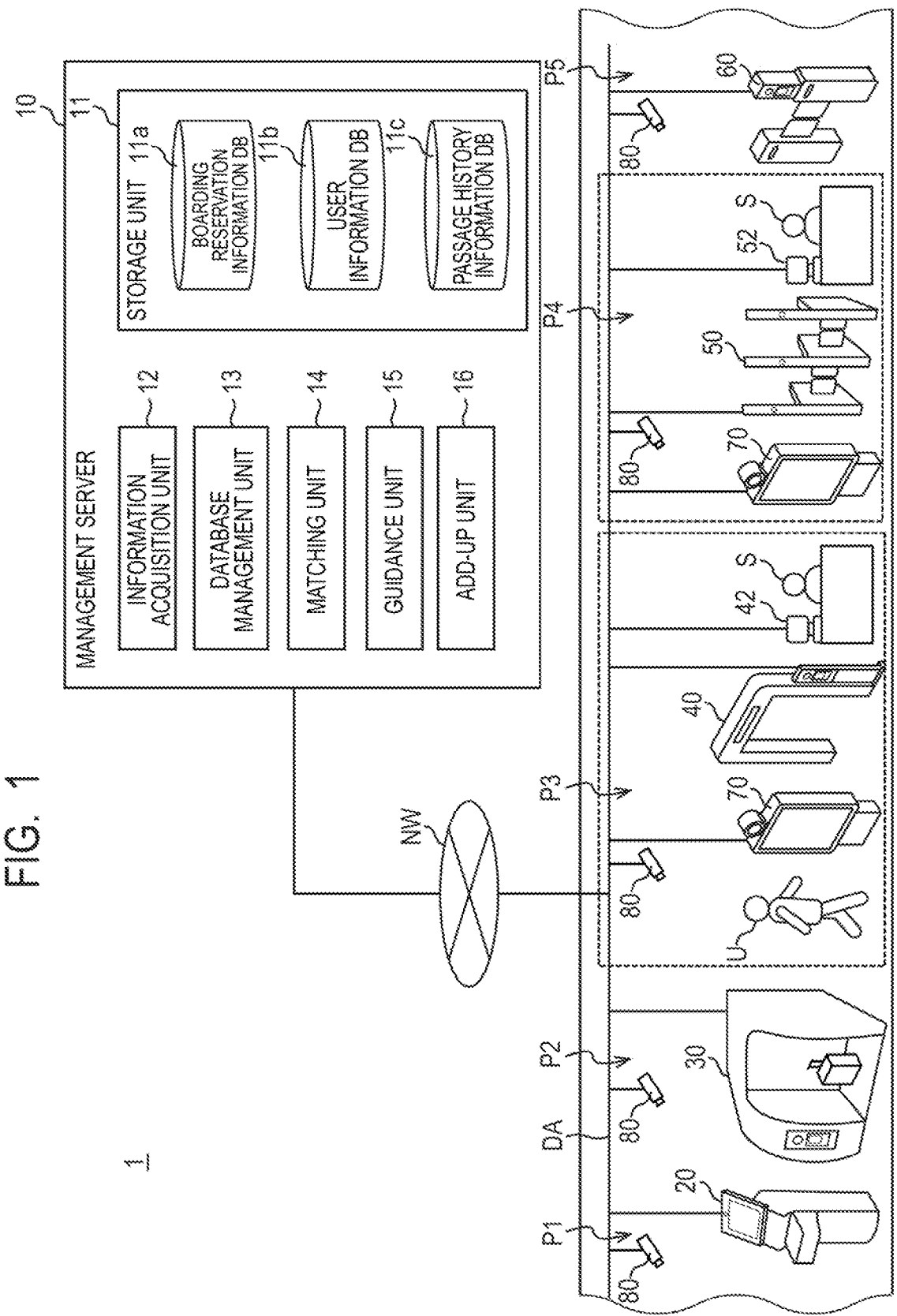
FIG. 1 is a schematic diagram illustrating an example of an overall configuration of an information processing system according to a first example embodiment.

FIG. 1 is a schematic diagram illustrating an example of the overall configuration of an information processing system 1 according to the present example embodiment. The information processing system 1 according to the present example embodiment is a computer system that supports a series of procedures performed in a first country and a second country, respectively, for a user (passenger) U who is scheduled to depart the first country from an airport DA in the first country by an aircraft and travel to the second country, for example. The information processing system 1 is operated by a public institution such as an immigration control bureau or a trustee entrusted with the operation from such an institution, for example. Note that, although only the apparatuses in the first country are illustrated for simplified illustration, the same can apply to procedures in the second country.

As illustrated in FIG. 1, the information processing system 1 includes a management server 10, a check-in terminal 20, an automatic baggage check-in machine 30, a security inspection apparatus 40, an automated gate apparatus 50, a boarding gate apparatus 60, operation terminals 42, 52, signage terminals 70, and cameras 80. The management server 10 and other apparatuses are connected to each other via a network NW. The network NW is formed of a local area network (LAN), a wide area network (WAN), a mobile communication network, or the like. The connection scheme may be a wireless scheme without being limited to a wired scheme.

The management server 10 is an information processing apparatus that manages various inspection procedures when the user U enters or departs the country. The management server 10 is installed in a facility of an airport company, an airline company, or the like operating the airport DA, for example. Note that the management server 10 is not necessarily required to be a single server and may be configured as a group of servers including a plurality of servers. For example, a server responsible for some of the functions of the management server 10 may be installed in the first country, and another server responsible for the remaining functions of the management server 10 may be installed in the second country.

As illustrated in FIG. 1, the management server 10 includes a storage unit 11, an information acquisition unit 12, a database management unit 13, a matching unit 14, a guidance unit 15, and an add-up unit 16.

The storage unit 11 stores information used in each unit of the management server 10. The storage unit 11 includes a boarding reservation information DB 11a, the user information DB 11b, and the passage history information DB 11c, for example.

The boarding reservation information DB 11a is a database that aggregates and stores boarding reservation information transmitted from reservation systems (not illustrated) of the airline companies, respectively.

FIG. 2 is a diagram illustrating an example of information stored in the boarding reservation information DB 11a. The boarding reservation information DB 11a has data items of a reservation number, a flight number, an airline code, a passenger name, a departure place, a destination, a flight date, a seat number, a nationality, a passport number, a family name, a first name, a date of birth, and a sexuality. Note that these data items are examples, and other data items may be further included. The reservation number is an identifier that uniquely identifies boarding reservation information. The airline code is an identifier that uniquely identifies an airline company.

The user information DB 11b is a database that stores information on the user U who has completed a check-in procedure.

FIG. 3 is a diagram illustrating an example of information stored in the user information DB 11b. The user information DB 11b has data items of a user ID, a registered face image, a feature amount, a passenger name, a reservation number, a departure place, a destination, a flight date, an airline code, a flight number, a seat number, a nationality, a passport number, a family name, a first name, a date of birth, a sexuality, and procedure status (P1) to procedure status (P5). Note that these data items are examples, and other data items may be further included.

The user ID is an identifier that uniquely identifies the user U. In the present example embodiment, the user ID is issued provided that a result of matching between a face image obtained by capturing the user U having a passport in a check-in procedure and a passport face image read from the passport is that the matching is successful. In the present example embodiment, the expression "matching is successful" means that a matching score indicating a similarity between biometric information on the user U and registered biometric information on a registrant is greater than or equal to a predetermined threshold. Further, the expression "matching is unsuccessful" means that a matching score is less than the predetermined threshold.

The registered face image is a face image registered for the user U. In the present example embodiment, the registered face image is registered during a check-in procedure. The registered face image may be registered in a procedure operation that is first performed out of a series of procedure operations performed when departing a country. It is preferable that a registered face image be registered based on consent from the user U and then deleted at a predetermined time. The feature amount is a value extracted from biometric information (registered face image).

The registered face image in the present example embodiment is registered, in the same manner as the user ID, provided that a result of matching between a face image obtained by capturing the user U having a passport in the first procedure operation (check-in procedure) and a passport face image read from the passport is that the matching is successful.

Further, as the registered face image, a face image captured in the first procedure operation at the place is used. The reason therefor is that a face image captured in the first procedure operation is newer than a passport face image and that the quality (appearance) is closer to an image captured in a subsequent authentication process than the passport face image. Instead of a target face image (captured face image), however, a passport face image may be set as a registered face image (registered biometric information).

The management server 10 matches face images (biometric information) captured at the automatic baggage check-in machine 30, the security inspection apparatus 40, the automated gate apparatus 50, the boarding gate apparatus 60, and the signage terminal 70 with registered face images stored in the user information DB 11b, respectively, and thereby performs identity verification as to whether or not the user U is a person who possesses an appropriate boarding thicket. The details will be described later.

Note that, although the term of biometric information in the present example embodiment means a face image and a feature amount extracted from the face image, biometric information is not limited to a face image and a face feature amount. That is, biometric authentication may be performed by using an iris image, a fingerprint image, a palmprint image, an auricle image, or the like as the biometric information on the user U.

The user information illustrated in FIG. 3 includes boarding reservation information illustrated in FIG. 2. The boarding reservation information on the user U is acquired from a passport and a recording medium such as a boarding ticket or the like during a check-in procedure and registered in the user information DB 11b on a user ID basis. The user information DB 11b and the boarding reservation information DB 11a are associated with each other by an airline code and a reservation number.

The passage history information DB 11c is a database that stores a passage history of the user U at the places (check points) for the series of procedural operations performed in departure from the country.

FIG. 4 is a diagram illustrating an example of information stored in the passage history information DB 11c. The passage history information DB 11c has data items of a user ID, a passage time, a device name, an operation system type, a passage touch point, and a procedural scheme. The passage time is a timestamp when the user U passed by a touch point. The device name is a machine name of an operation terminal used in a procedure at a touch point. The operation system type is a type of an operation system to which an operation terminal belongs.

The procedural scheme is a scheme of a procedure selected by the user U at each touch point. The procedural scheme may be, for example, a face authentication scheme, a face-to-face scheme, a self-service form, a web form, or the like, and a procedural scheme that can be selected differs in accordance with a touch point. The user information DB 11b and the passage history information DB 11c are associated with each other by a user ID.

The information acquisition unit 12 acquires information from the apparatuses at respective touch points P1 to P5. The database management unit 13 performs a registration process, an update process, and a search process on the database of the storage unit 11.

The matching unit 14 performs a process of matching between biometric information on the user U acquired by the signage terminal 70 and registered biometric information registered in the user information DB 11b and outputs the matching result thereof.

The guidance unit 15 guides the user U for a procedure place corresponding to a first scheme (biometric authentication scheme) if it is determined by the matching unit 14 that the user U is a registrant, and the guidance unit 15 generates guidance information about a way to a procedure place corresponding to a second scheme (authentication scheme other than biometric authentication) if it is determined that the user U is not a registrant. In the present example embodiment, hereafter, the procedure place where a procedure is automatically performed by using face authentication (biometric authentication) is referred to as a face authentication lane, and a place where a procedure is performed in a face-to-face scheme with a staff member S is referred to as a manned lane.

In the first scheme, a procedure is automatically performed based on a result of a process of matching between new biometric information on a user acquired at a procedure place and registered biometric information. Further, in the second scheme, the procedure is performed based on a medium carried by the user U in a state where the user U and the staff member S face each other. As a medium, a passport, a boarding ticket, or the like may be used.

The add-up unit 16 adds up and outputs each of the number of users who have completed a procedure by using the first scheme in the procedure area and the number of users who have completed the procedure by using the second scheme.

The check-in terminal 20 is installed in a check-in lobby or a check-in counter within the airport DA of the first country (departure country). Hereafter, a procedure area where the check-in terminal 20 is installed is referred to as "touch point P1". The check-in terminal 20 is a self-service terminal used by the user U to operate it by himself/herself to perform a check-in procedure (boarding procedure). After completion of a check-in procedure at the touch point P1, the user U moves to a baggage check-in place or a security inspection site.

The automatic baggage check-in machine 30 is installed in a region adjacent to a baggage check-in counter or a region near the check-in terminal 20 within the airport DA. Hereafter, a procedure area where the automatic baggage check-in machine 30 is installed is referred to as "touch point P2". The automatic baggage check-in machine 30 is a self-service terminal used by the user U to operate it by himself/herself to perform a procedure of checking in baggage that is not carried in or is not allowed to be carried in a passenger cabin. After completion of a baggage check-in procedure, the user U moves to the security inspection site. In a case of the user U having no baggage to check in, the procedure at the touch point P2 is omitted.

The security inspection apparatus 40 is installed in a security inspection site within the airport DA (hereafter, referred to as "touch point P3"). The term "security inspection apparatus" in the present example embodiment is used as a meaning including all of a metal detector that checks whether or not the user U is wearing a metal object that can be a dangerous article by using a metal detector, an X-ray inspection apparatus that uses X-ray to check whether or not there is a dangerous article in carry-on baggage or the like, a passage control apparatus that determines whether or not to permit passage of the user U at the entrance or exit of the security inspection site, or the like. After completion of a security inspection procedure performed by the security inspection apparatus 40 at the touch point P3, the user U moves to the departure inspection site. The operation terminal 42 is installed at a manned counter in the security inspection site. The staff member S uses the operation terminal 42 in order to perform a security inspection procedure on the user U.

Further, procedure places (inspection places) in the security inspection site are provided to a plurality of lanes, respectively. The user U selects a lane out of the plurality of lanes and is subjected to inspection. At the entrance of each lane, an identity verification procedure on the user U is performed before body search and baggage inspection.

The automated gate apparatus 50 is installed in the departure inspection site within the airport DA (hereafter, referred to as "touch point P4"). The automated gate apparatus 50 is an apparatus that automatically performs a departure inspection procedure for the user U. After completion of the departure inspection procedure at the touch point P4, the user U moves to a departure area where duty-free shops or boarding gates are provided. The operation terminal 52 is installed at a manned counter in the departure inspection site. The staff member S uses the operation terminal 52 in order to perform a departure inspection procedure on the user U.

The boarding gate apparatus 60 is installed for each boarding gate in the departure area (hereafter, referred to as "touch point P5"). The boarding gate apparatus 60 is a passage control apparatus that confirms that the user U is a passenger of an aircraft that is available for boarding through the boarding gate. After completion of the identity verification procedure at the touch point P5, the user U boards the aircraft and departs the country to the second country.

Each operation terminal 42, 52 is a terminal used by the staff member S of an airline company or an airport facility for operation at each touch point. Each operation terminal 42, 52 is a personal computer, a tablet terminal, a smartphone, or the like, for example. Note that, although only the operation terminals 42, 52 at the touch points P3, P4 are depicted for simplified illustration in the present example embodiment, such operation terminals may be installed similarly at other touch points.

The signage terminals 70 are installed at the security inspection site (touch point P3) and the departure inspection site (touch point P4). Each signage terminal 70 is a display terminal that displays information to guide the user U for a procedure place on a screen in accordance with display control from the management server 10. The signage terminal 70 sequentially transmits, to the management server 10, a face image in which the user U standing in front of the terminal is captured and thereby requests the management server 10 for one-to-N matching between the face image of the user U and the registered face images stored in the user information DB 11b.

Each camera 80 is a digital camera, for example, and is installed at respective touch points P1 to P5. For example, the camera 80 is attached to a ceiling, a wall, a pillar, or the like so that the camera 80 can capture the face or the entire body of the user U. The type of the camera 80 may be stationary or movable. The camera 80 sequentially transmits captured images to the management server 10. The management server 10 can use captured images for the purpose of face authentication of the user U, monitoring within the airport DA, or the like.

Figure 5:
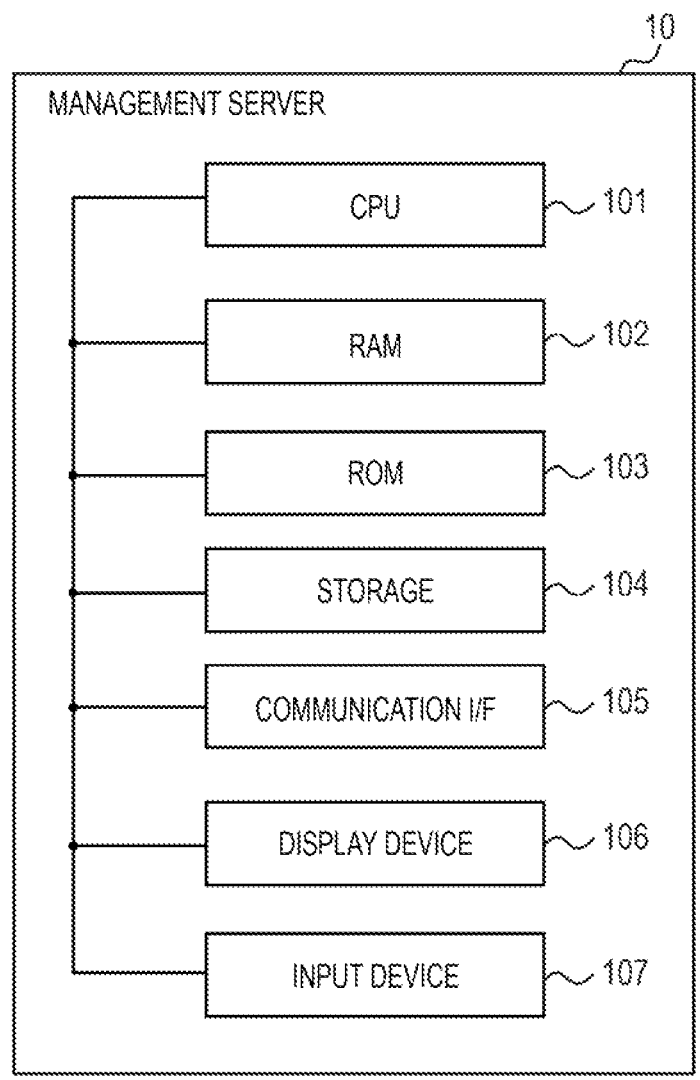
FIG. 5 is a block diagram illustrating an example of a hardware configuration of a management server according to the first example embodiment.

FIG. 5 is a block diagram illustrating an example of the hardware configuration of the management server 10. As illustrated in FIG. 5, the management server 10 includes a central processing unit (CPU) 101, a random access memory (RAM) 102, a read only memory (ROM) 103, a storage 104, a communication interface (I/F) 105, a display device 106, and an input device 107 as a computer that performs calculation, control, and storage. Respective devices are connected to each other via a bus, a wiring, a drive device, or the like.

The CPU 101 is a processor having functions of performing a predetermined operation in accordance with a program stored in the ROM 103 or the storage 104 and controlling each unit of the management server 10. The RAM 102 is formed of a volatile storage medium and provides a temporary memory area required for the operation of the CPU 101.

The ROM 103 is formed of a nonvolatile storage medium and stores necessary information such as a program used for the operation of the management server 10. The storage 104 is formed of a nonvolatile storage medium and stores a program used for operating the management server 10 and data. The storage 104 is formed of a hard disk drive (HDD) or a solid state drive (SSD), for example.

The communication I/F 105 is a communication interface based on a specification such as Ethernet (registered trademark), Wi-Fi (registered trademark), 4G, or the like and is a module used for communicating with another device.

The display device 106 is a liquid crystal display, an organic light emitting diode (OLED) display, or the like used for displaying a moving image, a still image, a text, or the like and is used for presenting information to the user.

The input device 107 is a keyboard, a pointing device, a button, or the like and accepts a user operation. The display device 106 and the input device 107 may be integrally formed as a touch panel.

Figure 6:
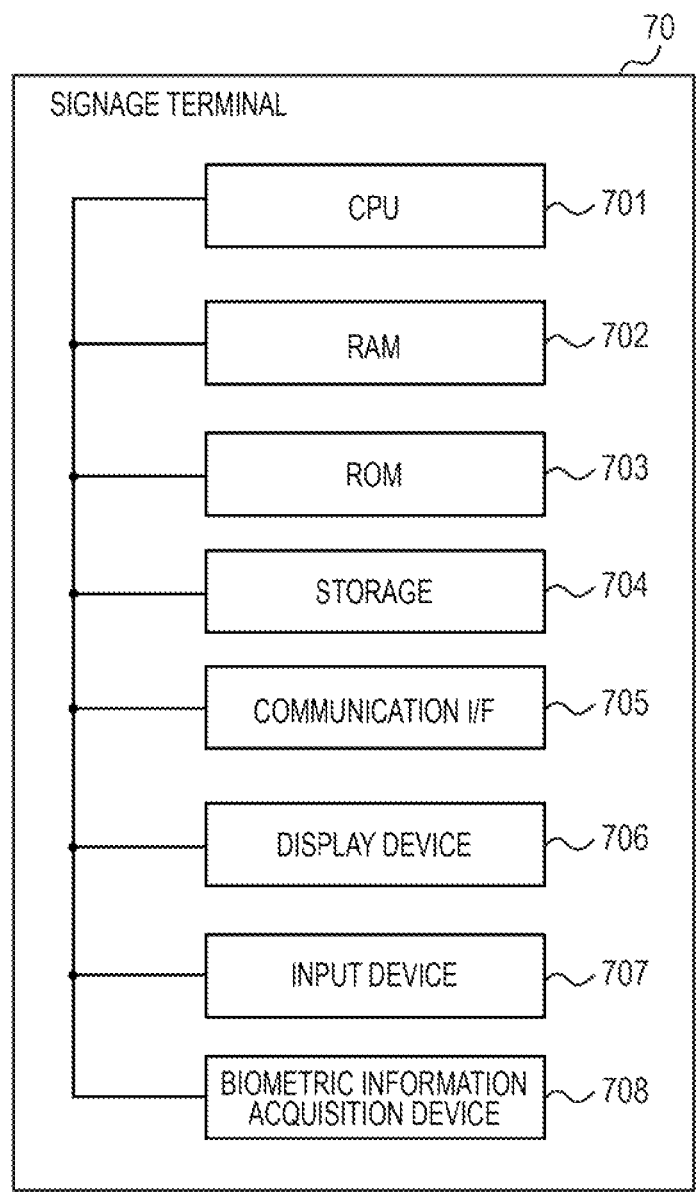
FIG. 6 is a block diagram illustrating an example of a hardware configuration of a signage terminal according to the first example embodiment.

FIG. 6 is a block diagram illustrating an example of a hardware configuration of the signage terminal 70. The signage terminal 70 has a CPU 701, a RAM 702, a ROM 703, a storage 704, a communication I/F 705, a display device 706, an input device 707, and a biometric information acquisition device 708.

The biometric information acquisition device 708 is a device that acquires a face image of the user U as biometric information on the user U. The biometric information acquisition device 708 is a digital camera that captures a face of the user U standing in front of the signage terminal 70, for example, and captures the face of the user U and acquires the face image thereof.

Note that the hardware configuration illustrated in FIG. 5 and FIG. 6 is an example, a device other than the above may be added, or some of the devices may not be provided. Further, some of the devices may be replaced with another device having substantially the same function. Further, some function in the present example embodiment may be provided by another device via the network NW, or the functions in the present example embodiment may be distributed to a plurality of devices and implemented therein. In such a way, the hardware configuration illustrated in FIG. 5 and FIG. 6 can be changed as appropriate.

Figure 7:
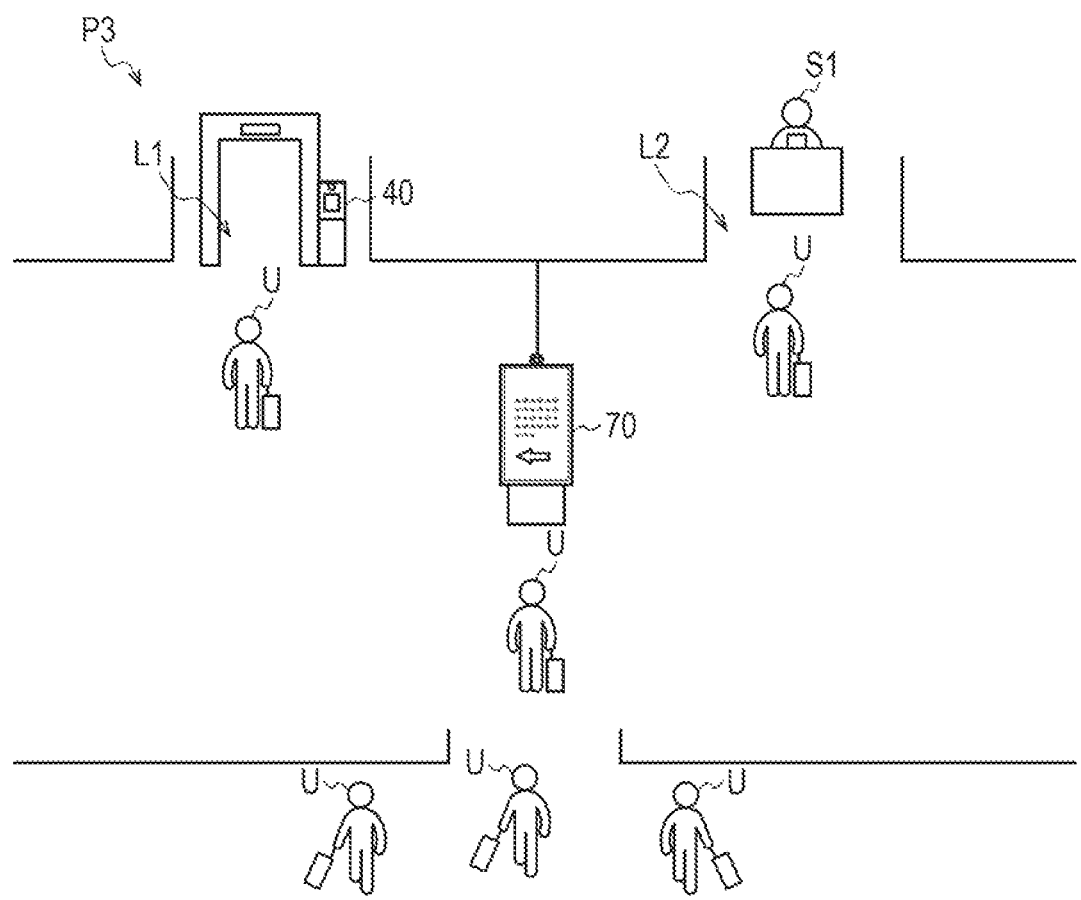
FIG. 7 is a layout diagram illustrating an example of an installation place of a signage terminal in a security inspection site according to the first example embodiment.

FIG. 7 is a layout diagram illustrating an example of an installation place of the signage terminal 70 in the security inspection site. In this example, a case where the signage terminal 70 is installed within a passage of the security inspection site (touch point P3) between a face authentication lane L1 and a face-to-face lane L2 provided with a manned counter is illustrated. The face authentication lane L1 is a procedure place corresponding to the face authentication scheme (first scheme). The face authentication lane L1 includes an automated lane involving use of face authentication. The face-to-face lane L2 is a procedure place corresponding to an authentication scheme other than face authentication (second scheme).

The user U selects one of the face authentication lane L1 and the face-to-face lane L2 and is subjected to security inspection. At the entrance of the face authentication lane L1 and the face-to-face lane L2, an identity verification procedure is performed on the user U. The identity verification is performed through face authentication in a case of the face authentication lane L1 or performed when the user U presents a medium such as a passport to the staff member S in a case of the face-to-face lane L2. After completion of the identity verification, body search and baggage inspection are performed on the user U.

When the user U is identified through biometric matching in the management server 10, the signage terminal 70 displays a screen that guides the user U to the face authentication lane L1. In contrast, when the user U is not identified through biometric matching in the management server 10, the signage terminal 70 displays a screen that guides the user U to the face-to-face lane L2.

Next, the operation of the information processing system 1 in the present example embodiment will be described with reference to the drawings.

[Guidance of User for Procedure Place]

Figure 8:
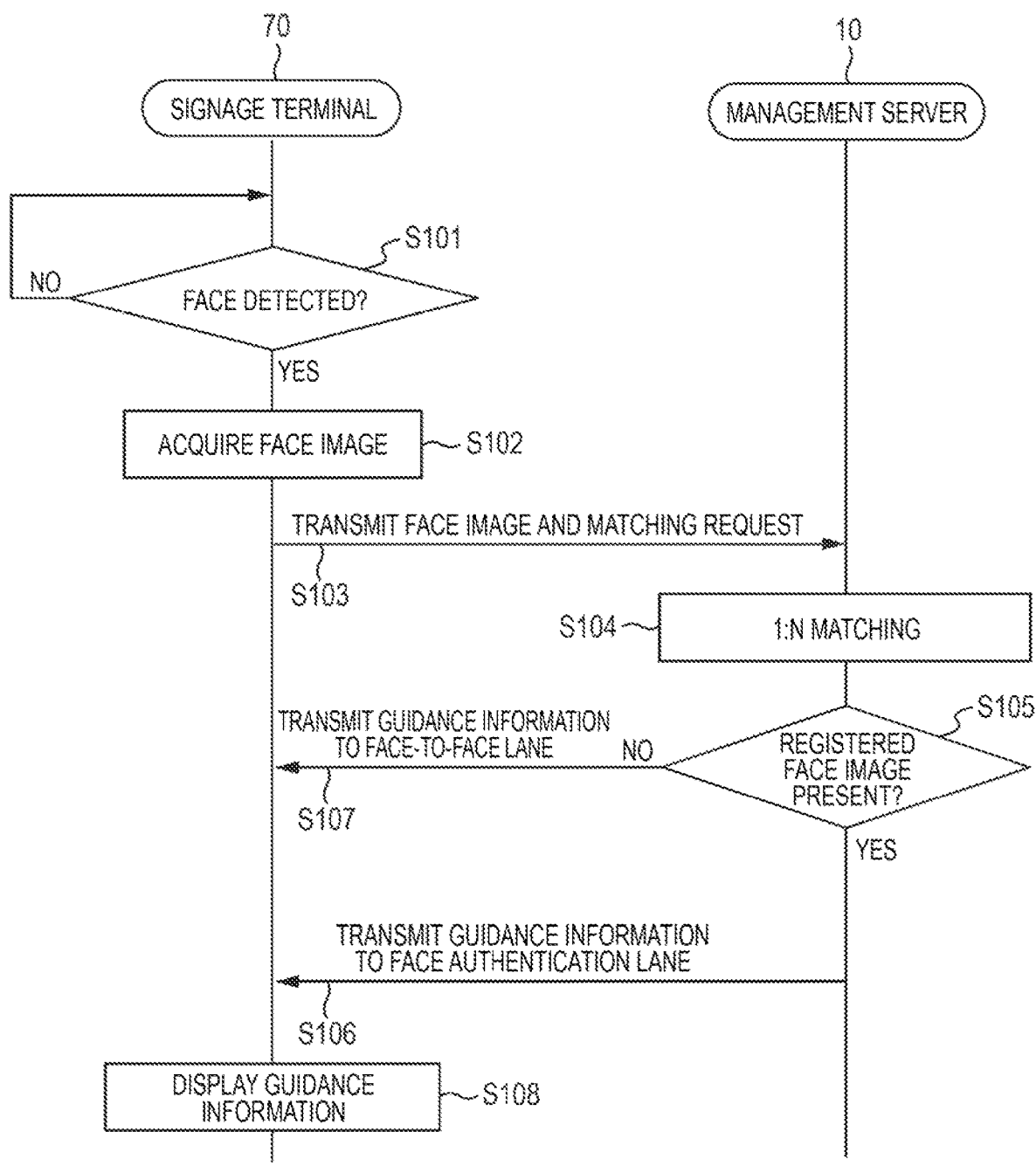
FIG. 8 is a sequence chart illustrating an example of a process between the management server and the signage terminal in the information processing system according to the first example embodiment.

FIG. 8 is a sequence chart illustrating an example of a process between the management server 10 and the signage terminal 70 in the information processing system 1. This process is performed when the user U enters the procedure area. In FIG. 8, a case where the user U enters the security inspection site is described as an example.

First, the signage terminal 70 continuously and periodically captures images of an area in front of the apparatus by using the biometric information acquisition device 708 and determines whether or not a face of the user U is detected in the captured image (step S101). The signage terminal 70 stands by until a face of the user U is detected in the image by the biometric information acquisition device 708 (step S101, NO).

If the signage terminal 70 determines that a face of the user U is detected by the biometric information acquisition device 708 (step S101, YES), the signage terminal 70 captures an image of the face of the user U and acquires a face image of the user U as a target face image (step S102).

Next, the signage terminal 70 transmits the target face image of the user U captured by the biometric information acquisition device 708 to the management server 10 via the network NW together with a matching request (step S103).

Accordingly, the signage terminal 70 requests the management server 10 to match the target face image of the user U captured by the biometric information acquisition device 708 with a plurality of registered face images registered in the user information DB 11b of the management server 10 in a one-to-N manner.

Next, in response to receiving the target face image and the matching request from the signage terminal 70, the management server 10 matches the target face image with the plurality of registered face images registered in the user information DB 11b in a one-to-N manner (step S104).

Next, the management server 10 determines whether or not a result of matching between the target face image and the registered face image is that the matching is successful (step S105). That is, the management server 10 determines whether or not there is a registered face image of a registrant who is authenticated as the same person as the user.

Herein, if the management server 10 determines that the result of the matching between the target face image and the registered face image is that the matching is successful (step S105, YES), the process proceeds to step S106.

In contrast, if the management server 10 determines that the result of the matching between the target face image and the registered face image is that the matching is unsuccessful (step S105, NO), the process proceeds to step S107.

In step S106, the management server 10 transmits guidance information about a way to the face authentication lane to the signage terminal 70.

On the other hand, in step S107, the management server 10 transmits guidance information about a way to the face-to-face lane to the signage terminal 70.

In step S108, in response to receiving the guidance information from the management server 10, the signage terminal 70 displays this in the screen on the display device 706 and ends the process.

Figure 9:
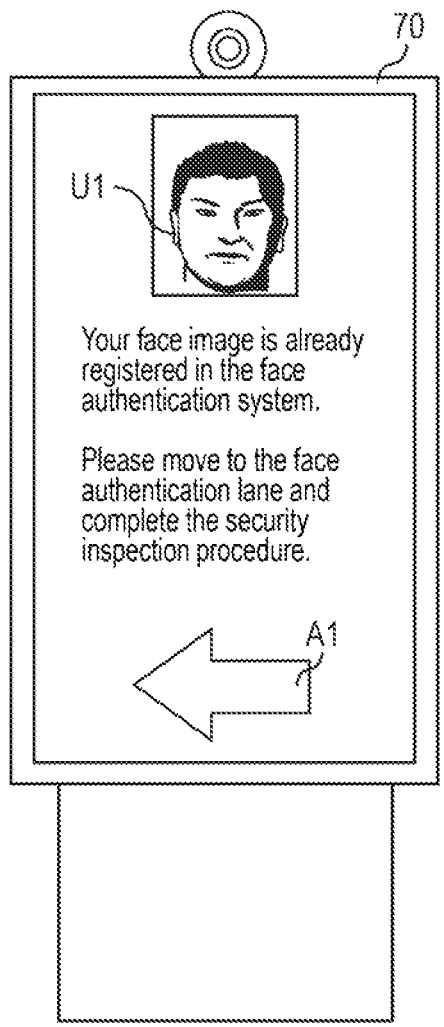
FIG. 9 is a diagram illustrating an example of a screen displayed on the signage terminal according to the first example embodiment.
Figure 10:
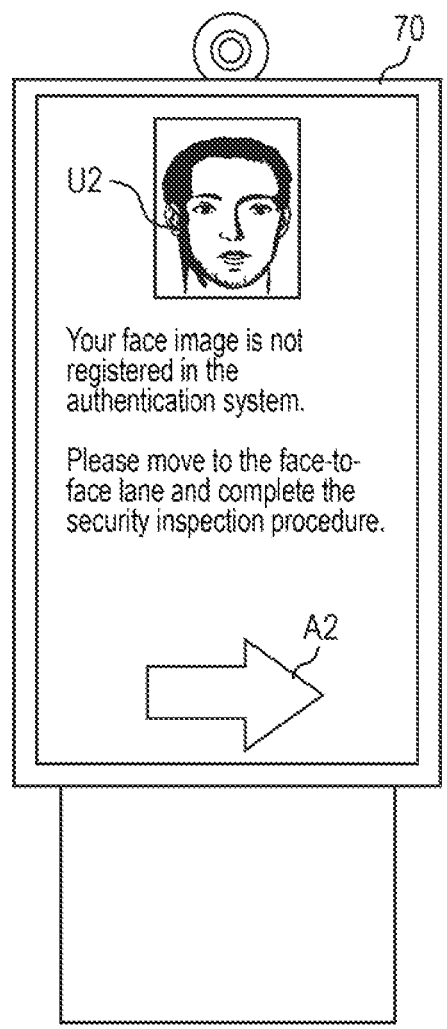
FIG. 10 is a diagram illustrating an example of a screen displayed on the signage terminal according to the first example embodiment.
Figure 11:
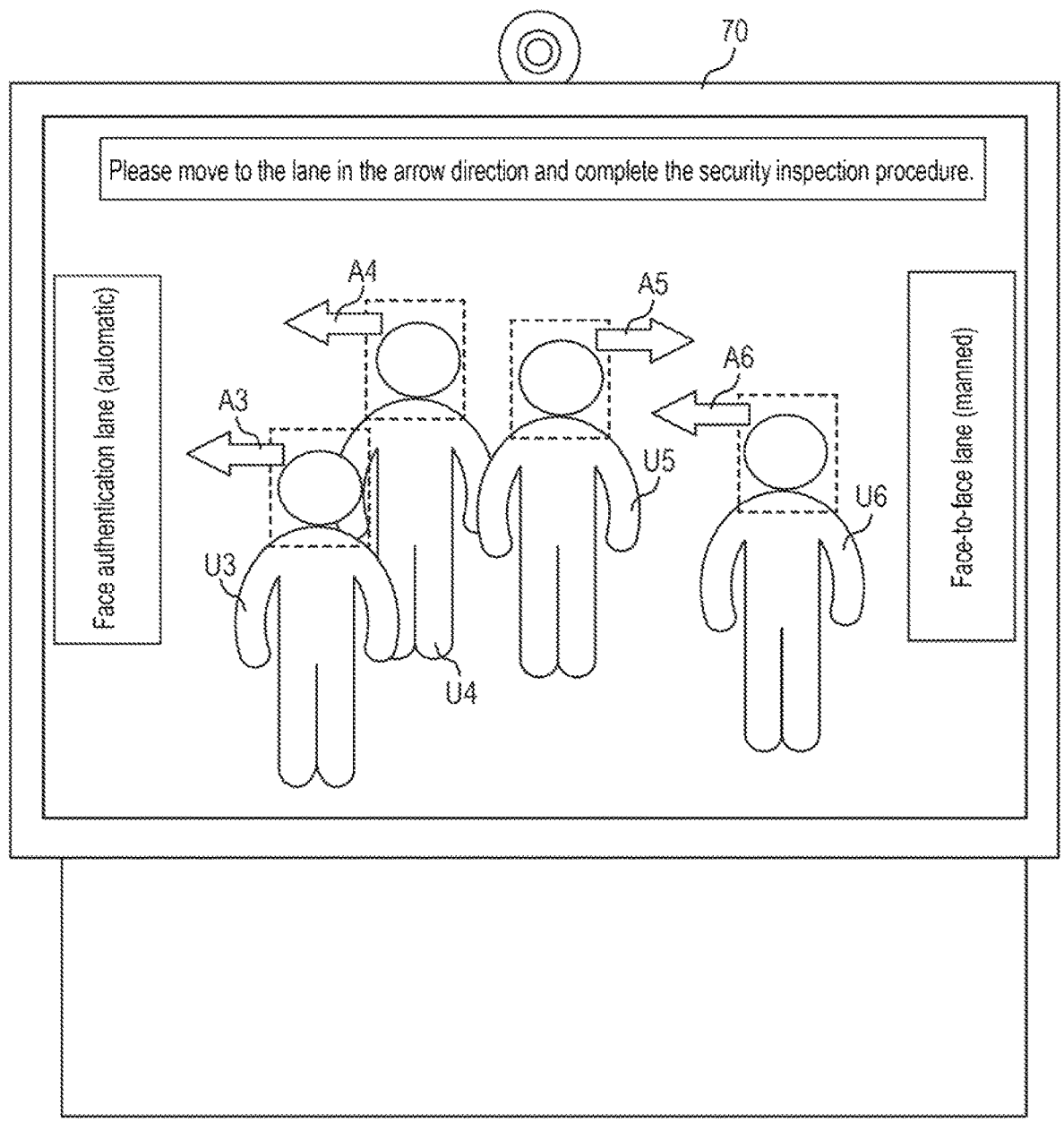
FIG. 11 is a diagram illustrating an example of a screen displayed on the signage terminal according to the first example embodiment.

FIG. 9 to FIG. 11 are diagrams illustrating examples of the screen displayed on the signage terminal 70. In FIG. 9, the screen displays a face image of the user U1, a message to guide the user U1 to the face authentication lane ("Your face image is already registered in the authentication system. Please move to the face authentication lane and complete the security inspection procedure."), and an arrow A1 indicating the direction of the face authentication lane.

The message of FIG. 9 is displayed when a result of matching between the face image of the user U1 captured at the signage terminal 70 and a registered face image of a registrant registered in the user information DB 11b is that the matching is successful (that is, when the management server 10 determines that the user U1 is a registrant).

In FIG. 10, the screen displays a face image of the user U2, a message to guide the user U2 to the face-to-face lane with the staff member S ("Your face image is not registered in the authentication system. Please move to the face-to-face lane and complete the security inspection procedure."), and an arrow A2 indicating the direction of the face-to-face lane.

The message of FIG. 10 is displayed when a result of matching between the face image of the user U2 captured at the signage terminal 70 and a registered face image of a registrant registered in the user information DB 11b is that the matching is unsuccessful (that is, when the management server 10 determines that the user U2 is not a registrant).

Further, when a face image is detected from a captured image in which a procedure area is captured, the management server 10 (the guidance unit 15) may generate a screen to superimpose and displays the guidance information on the detected region of the face image in the captured image.

In FIG. 11, a plurality of users U3 to U6 are included in the screen, and arrows A3 to A6 indicating procedure places for respective persons are superimposed and displayed on detected regions of respective face images of the users U3 to U6. In the case of FIG. 9 and FIG. 10, the guidance information is output for each user U. In contrast, in the case of FIG. 11, there is an advantage that the guidance information can be provided to a plurality of persons at the same time.

[Inquiry Process about Procedure Status]

Figure 12:
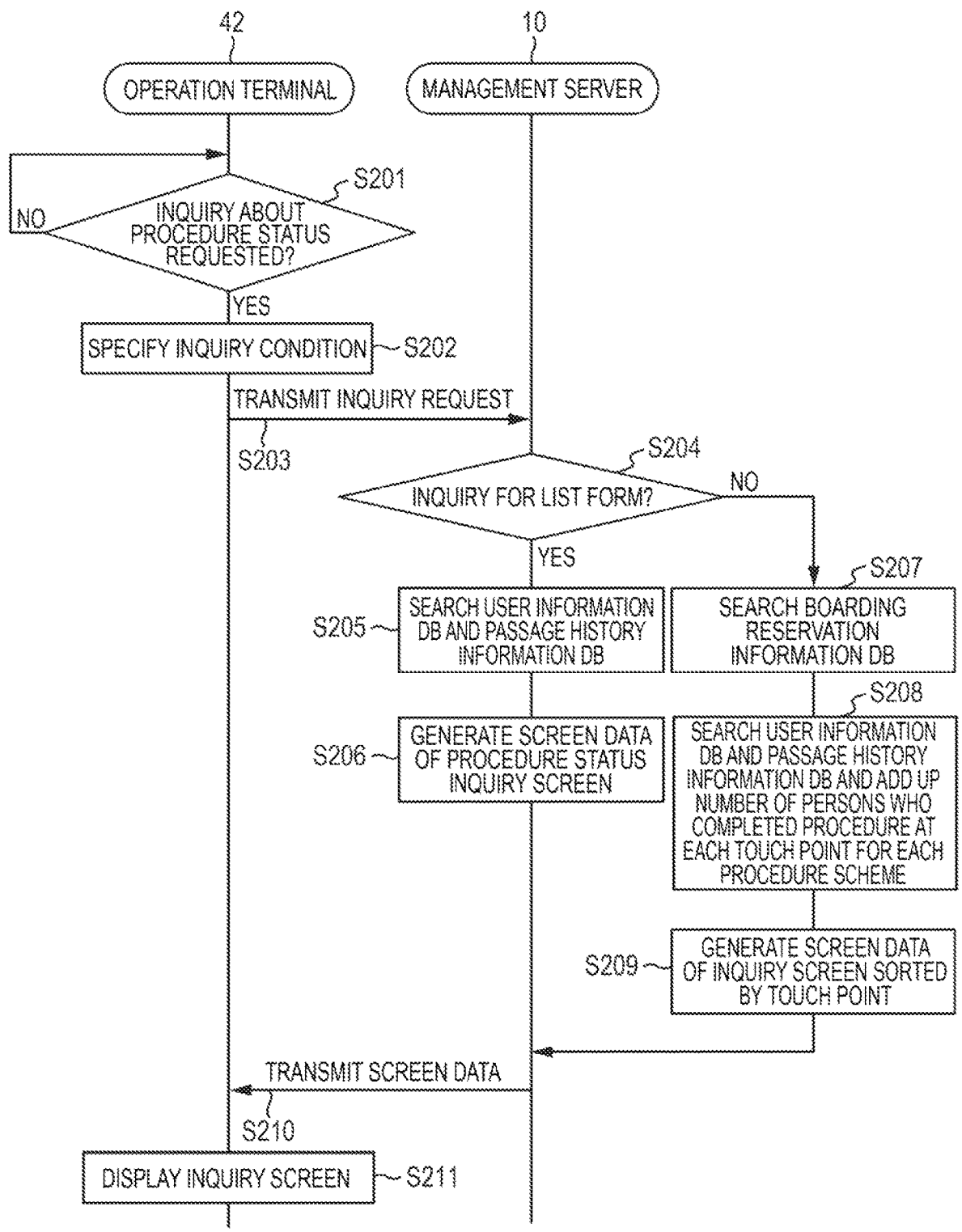
FIG. 12 is a sequence chart illustrating an example of a process between the management server and an operation terminal in the information processing system according to the first example embodiment.

FIG. 12 is a sequence chart illustrating an example of the process between the management server 10 and the operation terminal 42 in the information processing system 1. This process is performed when the staff member S inquiries about the procedure status of each user U in the airport. Although a case of using the operation terminal 42 will be described as an example in FIG. 12, the same applies to a case of the operation terminal 52 and other operation terminals (not illustrated).

First, the operation terminal 42 determines whether or not an inquiry about the procedure status of the user U is requested from the staff member S (step S201). Herein, if the operation terminal 42 determines that an inquiry about the procedure status is requested (step S201, YES), the process proceeds to step S202.

In contrast, if the operation terminal 42 determines that no inquiry about the procedure status is requested (step S201, NO), the standby state is maintained.

In step S202, the operation terminal 42 acquires inquiry conditions based on an input operation performed by the staff member S. Next, the operation terminal 42 transmits the inquiry request to the management server 10 (step S203).

Next, in response to receiving the inquiry request from the operation terminal 42, the management server 10 determines whether or not the inquiry request is an inquiry for a list form (step S204). Herein, if the management server 10 determines that the inquiry request is an inquiry for a list form (step S204, YES), the process proceeds to step S205.

In contrast, if the management server 10 determines that the inquiry request is not an inquiry for a list form (step S204, NO), the process proceeds to step S207.

In step S205, the management server 10 searches the user information DB 11b and the passage history information DB 11c. In accordance with the search, the management server 10 combines user information with passage history information on a user ID basis and generates screen data for a procedure status list screen representing the procedure status of each user U in a list form (step S206). The process then proceeds to step S210.

In step S207, the boarding reservation information DB 11a is searched. In accordance with the search, the management server 10 can acquire the number of pieces of boarding reservation information for the day.

Next, the management server 10 searches the user information DB 11b and the passage history information DB 11c to add up the total number of users U who have completed procedures at respective touch points and add up the number of users U for each procedural scheme (step S208).

Next, the management server 10 generates screen data of an inquiry screen sorted by the touch point (step S209). The process then proceeds to step S210.

In step S210, the management server 10 transmits the screen data generated in step S206 or step S209 to the operation terminal 42.

Then, in response to receiving the screen data from the management server 10, the operation terminal 42 displays an inquiry screen based on the screen data (step S211) and ends the process.

Figure 14:
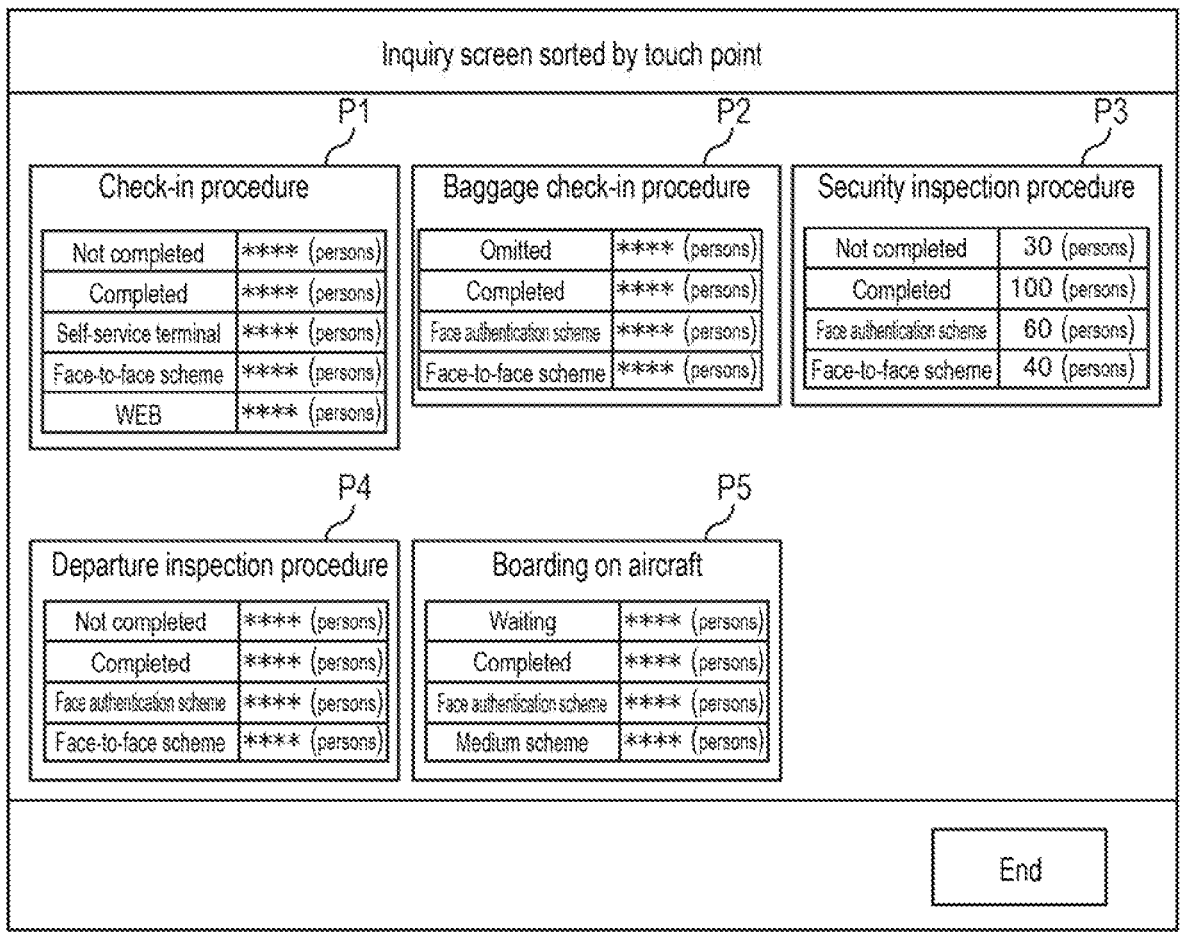
FIG. 14 is a diagram illustrating an example of a screen displayed on the operation terminal according to the first example embodiment.

FIG. 13 and FIG. 14 are diagrams illustrating examples of screens displayed on the operation terminal 42. FIG. 13 illustrates a procedure status list screen that displays, in a list form, user information acquired from the user information DB 11b and passage history information and procedural schemes sorted by the touch point acquired from the passage history information DB 11c. For example, the user U whose user ID is 10101 is a person whose face image is already registered, and this user U has completed the check-in procedure (P1), the baggage check-in procedure (P2), the security inspection procedure (P3), the departure inspection procedure (P4), and the boarding on an aircraft (P5) by using the automatic way and the face authentication.

Further, the user U whose user ID is 10102 is a person whose face image is not registered, and this user U has completed the check-in procedure (P1) with the check-in terminal 20 in the automatic way and completed the baggage check-in procedure (P2) and the security inspection procedure (P3) in a face-to-face form at a counter or the like with the staff member S.

Further, the user U whose user ID is 10103 is a person whose face image is already registered and the user U has completed the check-in procedure (P1) and the baggage check-in procedure (P2) by using the automatic way and face authentication. However, this user U (user ID: 10103) has completed the security inspection procedure (P3) in a face-to-face form. In such a way, according to the screen illustrated in FIG. 13, it is possible to easily recognize the progress status of procedures of the user U and the procedural scheme at each touch point.

FIG. 14 illustrates an inquiry screen sorted by the touch point that adds up and displays each of the number of persons who have not yet completed the procedure, the number of persons who have completed procedure, and the number of persons who have used each procedural scheme in the procedure at each touch point. For example, for the security inspection procedure, 30 persons out of the persons who completed the check-in procedure have not yet completed the security inspection procedure. Further, it is illustrated that 60 out of 100 persons who completed the security inspection procedure have used the face authentication scheme, and the remaining 40 persons have used the face-to-face scheme.

As described above, the information processing system 1 (the management server 10) of the present example embodiment matches a face image (biometric information) acquired from the user U with a plurality of registered face images (registered biometric information) registered in the user information DB 11b and, based on the matching result, guides the user U for a procedure place corresponding to the first scheme (biometric authentication scheme) or the second scheme (face-to-face scheme). Accordingly, it is possible to suppress a reduction in the throughput in a procedure area where a procedural scheme of face authentication or a procedural scheme other than face authentication can be selected.

Second Example Embodiment

Figure 15:
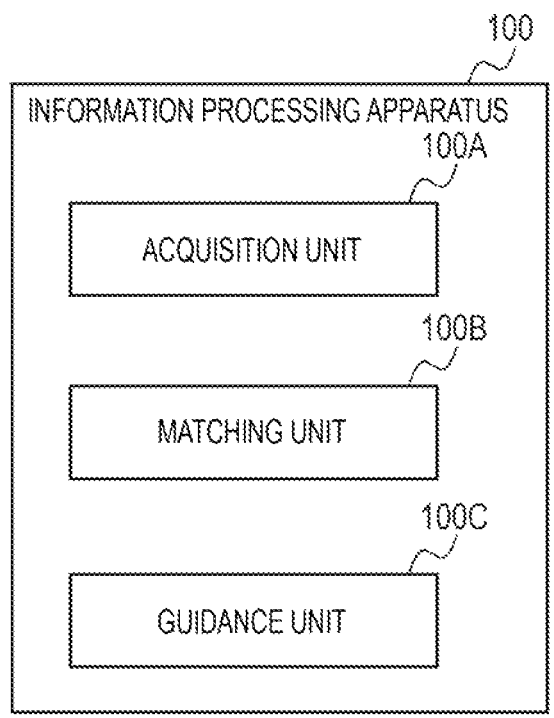
FIG. 15 is a function block diagram of an information processing apparatus according to a second example embodiment.

FIG. 15 is a function block diagram of the information processing apparatus 100 in the present example embodiment. The information processing apparatus 100 includes an acquisition unit 100A, a matching unit 100B, and a guidance unit 100C. The acquisition unit 100A acquires biometric information on a user in a procedure area where the user is able to select a first scheme involving use of biometric authentication in a procedure or a second scheme not involving use of biometric authentication in the procedure. The matching unit 100B matches the biometric information with registered biometric information on a registrant who is allowed to use the first scheme, and the matching unit 100B then determines whether or not the user is a registrant. When it is determined by the matching unit 100B that the user is the registrant, the guidance unit 100C guides the user for a procedure place corresponding to the first scheme, and when it is determined that the user is not the registrant, the guidance unit 100C generates guidance information about a way to a procedure place corresponding to the second scheme.

According to the present example embodiment, the information processing apparatus 100 that can improve the throughput in a procedure area where a procedural scheme involving use of biometric authentication or a procedural scheme involving use of an authentication method other than biometric authentication can be selected is provided.

Modified Example Embodiment

The present invention is not limited to the example embodiments described above and can be changed as appropriate within the scope not departing from the spirit of the present invention. For example, an example in which a part of the configuration of any of the example embodiments is added to another example embodiment or an example in which a part of the configuration of any of the example embodiments is replaced with a part of the configurations of another example embodiment is also one of the example embodiments of the present invention.

Further, the configuration of the present invention can be applied not only to international flights but also to domestic flights. In a case of a domestic flight, it is possible to omit not only a departure inspection procedure but also a one-to-one process of matching between a passport face image and a captured face image. In such a case, a face image captured at purchase of a boarding ticket can be registered as the registered biometric image, for example.

Although the security inspection procedure at departure from a country has been described as an example in the above example embodiments, the procedure area to which the present invention can be applied is not limited to the security inspection site. For example, in a case of an airport facility, the present invention can also be applied to a procedure area such as a departure inspection site, an immigration site, a custom inspection site, or the like.

Further, the configuration of the present invention can be applied to procedures other than those performed in an airport. Specific examples of such procedures include a payment procedure performed on a user U who purchases an item in a shop or a user U who receives a service. When a face-authenticating type cash register corresponding to face authentication and a manned cash register with the staff member S are provided in a shop and the user U is able to select which cash register to use, the same advantageous effect as above is achieved. That is, the configuration of the present invention can be applied to any procedure area where the user U is able to select the first scheme involving use of biometric authentication in a procedure or the second scheme not involving use of biometric authentication in the procedure.

The management server 10 (the guidance unit 15) may guide a user to a procedure place corresponding to attribute information on the user U associated with registered biometric information. For example, this is effective when there is a priority lane for performing an inspection procedure with priority on the user U whose attribute information satisfies a particular condition. Specifically, when the user information DB 11b includes attribute information such as a membership category of an airline company (standard member/VIP member, or the like), the presence or absence of an accompanying person needing support of the user U, or the like, the user U may be guided to the priority lane based on the attribute information on the user U acquired by face authentication.

Further, although the configuration in which the management server 10 guides the user U to an appropriate lane in the procedure place when the user U is standing in front of the signage terminal 70 has been described in the above example embodiments, the example embodiment may be configured to be able to guide the user U at a terminal other than the signage terminal 70 connected to the management server 10.

For example, the example embodiment may be configured such that, when the user U operates a KIOSK terminal installed in an airport, a face image (biometric information) of the user U is captured by the KIOSK terminal and transmitted to the management server 10, and it is determined on the management server 10 side whether or not the face image is already registered. If the management server 10 determines that the face image of the user U is already registered in the user information DB 11b, the user U is guided on the KIOSK terminal for the procedure place at each touch point. Further, if the management server 10 determines that the face image of the user U is not registered in the user information DB 11b, the user U is urged on the KIOSK terminal to perform registration to the face authentication system. Then, in response to registration of the user face of the user U to the user information DB 11b of the management server 10, the KIOSK terminal guides the user U for the procedure place based on control from the management server 10.

Further, the camera 80 illustrated in FIG. 1 may be provided to the apparatus at respective touch points P1 to P5 (the check-in terminal 20, the automatic baggage check-in machine 30, the security inspection apparatus 40, the automated gate apparatus 50, the boarding gate apparatus 60).

Further, the data items displayed in the inquiry screen sorted by the touch point illustrated in FIG. 14 are examples and are not limited thereto. For example, the number of users (passengers) U who, even after having registered the face image in the check-in procedure, have carried out the procedure in the face-to-face scheme instead of the face authentication scheme in the subsequent procedure may be further displayed. Accordingly, the number of users U who have registered their face images and the number of users U who have actually selected the face authentication scheme can be recognized for each touch point.

Further, an average value of time of passage of the user U may be calculated and displayed for the face authentication scheme and the face-to-face scheme, respectively, on a procedure basis. Furthermore, the example embodiment may be configured such that the touch point passage time of all the users U may be recorded and then displayed on a user U basis.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself. Further, one or two or more components included in the example embodiments described above may be circuitry such as application specific integrated circuit (ASIC), field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments also includes an example that operates on operating system (OS) to perform a process in cooperation with another software or a function of an add-in board without being limited to an example that performs a process by an individual program stored in the storage medium.

The service implemented by the function of each example embodiment described above can also be provided to a user in a form of Software as a Service (SaaS).

Note that all the example embodiments described above are to simply illustrate embodied examples in implementing the present invention, and the technical scope of the present invention should not be construed in a limiting sense by those example embodiments. That is, the present invention can be implemented in various forms without departing from the technical concept or the primary feature thereof.

The whole or part of the example embodiments disclosed above can be described as, but not limited to, the following supplementary notes.

(Supplementary Note 1)

An information processing apparatus comprising:

an acquisition unit that acquires biometric information on a user in a procedure area where the user is able to select a first scheme involving use of biometric authentication in a procedure or a second scheme not involving use of the biometric authentication in the procedure;

a matching unit that matches the biometric information with registered biometric information on a registrant, the registrant being allowed to use the first scheme, and determines whether or not the user is the registrant; and a guidance unit that, when it is determined by the matching unit that the user is the registrant, guides the user for a procedure place corresponding to the first scheme and, when it is determined that the user is not the registrant, generates guidance information about a way to a procedure place corresponding to the second scheme.

(Supplementary Note 2)

The information processing apparatus according to supplementary note 1, wherein the biometric information is a face image.

(Supplementary Note 3)

The information processing apparatus according to supplementary note 1 or 2, wherein in the first scheme, the procedure is automatically performed based on a result of a process of matching between new biometric information on the user acquired at the procedure place and the registered biometric information.

(Supplementary Note 4)

The information processing apparatus according to any one of supplementary notes 1 to 3, wherein in the second scheme, the procedure is performed based on a medium carried by the user in a state where the user and a staff member face each other.

(Supplementary Note 5)

The information processing apparatus according to any one of supplementary notes 1 to 4, wherein the guidance unit causes a display terminal to display the guidance information.

(Supplementary Note 6)

The information processing apparatus according to supplementary note 2, wherein when the face image is detected from a captured image in which the procedure area is captured, the guidance unit generates a screen that superimposes and displays the guidance information on a detected region of the face image in the captured image.

(Supplementary Note 7)

The information processing apparatus according to any one of supplementary notes 1 to 6 further comprising an add-up unit that adds up and outputs each of the number of users who completed the procedure by using the first scheme and the number of users who completed the procedure by using the second scheme in the procedure area.

(Supplementary Note 8)

The information processing apparatus according to any one of supplementary notes 1 to 7, wherein the guidance unit guides the user to the procedure place corresponding to attribute information on the user associated with the registered biometric information.

(Supplementary Note 9)

The information processing apparatus according to any one of supplementary notes 1 to 8, wherein the procedure includes an inspection procedure performed on the user during travel in an airport.

(Supplementary Note 10)

The information processing apparatus according to supplementary note 9, wherein the inspection procedure includes at least one of a security inspection procedure, a departure inspection procedure, an immigration procedure, and a custom inspection procedure.

(Supplementary Note 11)

The information processing apparatus according to any one of supplementary notes 1 to 10, wherein the procedure includes a payment procedure performed on the user who purchases an item in a shop or the user who receives a service.

(Supplementary Note 12)

An information processing method comprising:

acquiring biometric information on a user in a procedure area where the user is able to select a first scheme involving use of biometric authentication in a procedure or a second scheme not involving use of the biometric authentication in the procedure;

matching the biometric information with registered biometric information on a registrant, the registrant being allowed to use the first scheme, and determining whether or not the user is the registrant; and when it is determined that the user is the registrant, guiding the user for a procedure place corresponding to the first scheme and, when it is determined that the user is not the registrant, guiding the user about a procedure place corresponding to the second scheme.

(Supplementary Note 13)

A storage medium storing a program that causes a computer to perform:

acquiring biometric information on a user in a procedure area where the user is able to select a first scheme involving use of biometric authentication in a procedure or a second scheme not involving use of the biometric authentication in the procedure;

matching the biometric information with registered biometric information on a registrant, the registrant being allowed to use the first scheme, and determining whether or not the user is the registrant; and when it is determined that the user is the registrant, guiding the user for a procedure place corresponding to the first scheme and, when it is determined that the user is not the registrant, guiding the user about a procedure place corresponding to the second scheme.

REFERENCE SIGNS LIST

NW network
U, U1 to U6 user
S staff member
1 information processing system
10 management server
11 storage unit
11a boarding reservation information DB
11b user information DB
11c passage history information DB
12 information acquisition unit
13 database management unit
14 matching unit
15 guidance unit
16 add-up unit
20 check-in terminal
30 automatic baggage check-in machine
40 security inspection apparatus
42, 52 operation terminal
50 automated gate apparatus
60 boarding gate apparatus
70 signage terminal
80 camera

What is claimed is:

1. An information processing apparatus comprising:
at least one memory storing instructions; and
at least one processor configured to execute the instructions to:
acquire biometric information on a user in a procedure area where the user is able to select a first scheme involving use of biometric authentication in a procedure or a second scheme not involving use of the biometric authentication in the procedure;
match the biometric information with registered biometric information on a registrant, the registrant being allowed to use the first scheme, and determines whether or not the user is the registrant; and
when it is determined that the user is the registrant, guide the user for a procedure place corresponding to the first scheme and, when it is determined that the user is not the registrant, generate guidance information about a way to a procedure place corresponding to the second scheme.

2. The information processing apparatus according to claim 1, wherein the biometric information is a face image.

3. The information processing apparatus according to claim 1, wherein in the first scheme, the procedure is automatically performed based on a result of a process of matching between new biometric information on the user acquired at the procedure place and the registered biometric information.

4. The information processing apparatus according to claim 1, wherein in the second scheme, the procedure is performed based on a medium carried by the user in a state where the user and a staff member face each other.

5. The information processing apparatus according to claim 1, wherein the at least one processor is further configured to execute the instructions to:
cause a display terminal to display the guidance information.

6. The information processing apparatus according to claim 2, wherein when the face image is detected from a captured image in which the procedure area is captured,
wherein the at least one processor is further configured to execute the instructions to:
generate a screen that superimposes and displays the guidance information on a detected region of the face image in the captured image.

7. The information processing apparatus according to claim 1, wherein the at least one processor is further configured to execute the instructions to:
add up and output each of the number of users who completed the procedure by using the first scheme and the number of users who completed the procedure by using the second scheme in the procedure area.

8. The information processing apparatus according to claim 1, wherein the at least one processor is further configured to execute the instructions to:
guide the user to the procedure place corresponding to attribute information on the user associated with the registered biometric information.

9. The information processing apparatus according to claim 1, wherein the procedure includes an inspection procedure performed on the user during travel in an airport.

10. The information processing apparatus according to claim 9, wherein the inspection procedure includes at least one of a security inspection procedure, a departure inspection procedure, an immigration procedure, and a custom inspection procedure.

11. The information processing apparatus according to claim 1, wherein the procedure includes a payment procedure performed on the user who purchases an item in a shop or the user who receives a service.

12. An information processing method comprising:
acquiring biometric information on a user in a procedure area where the user is able to select a first scheme involving use of biometric authentication in a procedure or a second scheme not involving use of the biometric authentication in the procedure;
matching the biometric information with registered biometric information on a registrant, the registrant being allowed to use the first scheme, and determining whether or not the user is the registrant; and
when it is determined that the user is the registrant, guiding the user for a procedure place corresponding to the first scheme and, when it is determined that the user is not the registrant, guiding the user about a procedure place corresponding to the second scheme.

13. A non-transitory storage medium storing a program that causes a computer to perform:
acquiring biometric information on a user in a procedure area where the user is able to select a first scheme involving use of biometric authentication in a procedure or a second scheme not involving use of the biometric authentication in the procedure;

matching the biometric information with registered biometric information on a registrant, the registrant being allowed to use the first scheme, and determining whether or not the user is the registrant; and when it is determined that the user is the registrant, guiding the user for a procedure place corresponding to the first scheme and, when it is determined that the user is not the registrant, guiding the user about a procedure place corresponding to the second scheme.

\* \* \* \* \*